US008862305B1

(12) United States Patent  
Kim et al.

(10) Patent No.: US 8,862,305 B1
(45) Date of Patent: Oct. 14, 2014

(54) SYSTEM AND METHOD FOR OPERATING POSITIVE TEMPERATURE COEFFICIENT HEATER IN FUEL CELL VEHICLE

(71) Applicant: Hyundai Motor Company, Seoul (KR)

(72) Inventors: Eung Young Kim, Anyang-si (KR); Byeong Moo Jang, Suwon-si (KR); Jun Mo Ku, Suwon-si (KR); Hae Dong Youn, Incheon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/033,237

(22) Filed: Sep. 20, 2013

(30) Foreign Application Priority Data

Jun. 13, 2013 (KR) .......................... 10-2013-0067699

(51) Int. Cl.
  *B60L 9/00* (2006.01)
  *B60L 11/00* (2006.01)
  *B60L 11/18* (2006.01)

(52) U.S. Cl.
  CPC .................................. *B60L 11/1894* (2013.01)
  USPC ......................................................... 701/22

(58) Field of Classification Search
  CPC ....... H05B 1/0236; F24H 1/162; F24H 1/009; F24H 3/0429; F24H 9/1854; F24H 9/1863; F24H 9/1872; B60H 1/2218; B60H 1/004; B60H 1/00392; B60H 1/00385; F28D 2021/0043; H01M 8/04298; H01M 8/04007; H01M 8/0491; H01M 8/0494; H01M 8/04977; H01M 2250/20; Y02Y 90/169; Y02E 60/50
  USPC ........... 701/22, 36; 180/65.1, 65.29; 392/304; 307/9.1, 10.3, 10.6; 165/200–202; 219/202; 429/429–436; 454/69, 454/159–161
  See application file for complete search history.

(56) References Cited

U.S. PATENT DOCUMENTS

| | | | |
|---|---|---|---|
| 4,132,211 A * | 1/1979 | Wilfert et al. ................. | 123/453 |
| 5,825,138 A * | 10/1998 | Diazzi et al. .................. | 315/294 |
| 2004/0146757 A1* | 7/2004 | Gottwick et al. ............... | 429/13 |
| 2004/0185764 A1* | 9/2004 | Ichishi et al. ................... | 454/75 |
| 2009/0087723 A1* | 4/2009 | Inda ............................... | 429/62 |
| 2009/0139781 A1* | 6/2009 | Straubel ........................ | 180/65.1 |
| 2011/0014534 A1* | 1/2011 | Sung et al. .................... | 429/429 |
| 2012/0086278 A1* | 4/2012 | Kanie et al. .................... | 307/66 |
| 2012/0118988 A1* | 5/2012 | Lee et al. ................. | 237/12.3 R |
| 2012/0122000 A1* | 5/2012 | Lee et al. ...................... | 429/429 |

FOREIGN PATENT DOCUMENTS

KR 10-2011-0006527 A 1/2011

* cited by examiner

*Primary Examiner* — Yonel Beaulieu
(74) *Attorney, Agent, or Firm* — McDermott Will & Emery LLP

(57) ABSTRACT

A system for operating a positive temperature coefficient (PTC) heater in a fuel cell vehicle includes a fuel cell stack and a PTC heater generating heat when supplied with an electric current. A controller is configured to check a key-start state of the vehicle and determine whether or not an outdoor temperature is lower than a reference temperature. If it is determined that the vehicle is key-started so as to activate the fuel cell stack, and the outdoor temperature is lower than the reference temperature, the controller supplies electrical energy generated by the fuel cell stack to the PTC heater, thereby driving the PTC heater.

8 Claims, 3 Drawing Sheets

SYSTEM AND METHOD FOR OPERATING POSITIVE TEMPERATURE COEFFICIENT HEATER IN FUEL CELL VEHICLE

CROSS-REFERENCE TO RELATED APPLICATION

This application claims under 35 U.S.C. §119(a) the benefit of Korean Patent Application No. 10-2013-0067699 filed on Jun. 13, 2013 the entire contents of which are incorporated herein by reference.

TECHNICAL FIELD

The present disclosure relates to a system and method for operating a positive temperature coefficient (PTC) heater in a fuel cell vehicle, and more particularly, to a system and method controlling the PTC heater to facilitate the heating of fuel cell stacks, thereby improving cold startability and heating efficiency of a fuel cell vehicle.

BACKGROUND

In general, a fuel cell vehicle equipped with a fuel cell system uses fuel cell stacks to produce electricity with hydrogen and drives by powering an electric motor using the electricity produced.

The fuel cell vehicle includes a fuel cell stack which triggers an electrochemical reaction between hydrogen and oxygen to produce electrical energy; fuel-feeding system which feeds hydrogen to the fuel cell stack; an oxygen-feeding system including a blower, and an air valve, which feeds oxygen required for the electrochemical reaction, to the fuel cell stack; and a cooling system cooling the heat generated from the fuel cell stack to maintain a constant temperature.

At sub-zero temperature, in the fuel cell vehicle according to the related art, cooling water and fuel in the fuel cell stack freezes, causing an error in the operation of the fuel cell system.

The fuel cell stack can be activated and drive the vehicle when the stack is heated to an operation temperature. It takes a long time to raise the temperature of the fuel cell stack in sub-zero temperatures.

In winter, when a driver tries to immediately raise the low internal temperature of a vehicle by operating a heater, it is difficult to generate warm air until the fuel cell stack, and cooling water are heated to the operation temperature.

Thus, there needs to be an improvement in a fuel cell vehicle with a technique capable of immediately providing warm air to occupants of the vehicle and shortening cold start time, even in sub-zero temperatures, such as in winter, thereby improving heating performance and cold startability.

The foregoing is intended merely to aid in the understanding of the background of the present disclosure, and is not intended to mean that the present disclosure falls within the purview of the related art that is already known to those skilled in the art.

SUMMARY

The present disclosure provides a system and method for operating a positive temperature coefficient (PTC) heater in a fuel cell vehicle, which is capable of improving cold startability of the fuel cell vehicle and immediately providing warm air even in the sub-zero cold, such as in winter.

According to an aspect of the present disclosure, a system for operating a positive temperature coefficient (PTC) heater in a fuel cell vehicle includes a fuel cell stack, a PTC heater generating heat when supplied with an electric current, and a controller configured to check a key-start state of the vehicle and determine whether or not an outdoor temperature is lower than a reference temperature. If it is determined that the vehicle is key-started to activate the fuel cell stack and that the outdoor temperature is lower than the reference temperature, the controller supplies electrical energy generated by the fuel cell stack to the PTC heater, thereby driving the PTC heater.

The reference temperature may be minus 15 degrees Celsius, and the controller may drive the PTC heater when the outdoor temperature falls to minus 15 degrees Celsius or lower.

The controller may operate a blower of the fuel cell stack at maximum output so as to activate and warm up the fuel cell stack.

The controller may discontinue the electrical energy supply from the fuel cell stack to the PTC heater when the temperature of the fuel cell stack reaches the operation temperature.

The controller may determine whether or not the temperature of cooling water is lower than the reference temperature when operating a heating system of the vehicle. If it is determined that the temperature of cooling water is lower than the reference temperature, the controller drives the PTC heater.

In accordance with another aspect of the present disclosure, a method of operating a positive temperature coefficient (PTC) heater in a fuel cell vehicle includes a stage of checking a key-start state of the vehicle, and if the vehicle is key-started, determining whether or not there is a voltage of a fuel cell stack, and a stage of checking whether or not an outdoor temperature is lower than a reference temperature. When it is determined that the vehicle is key-started so as to activate the fuel cell stack and that the outdoor temperature is lower than the reference temperature, electrical energy generated by the fuel cell stack is supplied to the PTC heater so as to drive the PTC heater. Activating and warming up stage activates and warms up the fuel cell stack as the PTC heater is powered.

The warming up stage may discontinue the electrical energy supply from the fuel cell stack to the PTC heater when the temperature of the fuel cell stack reaches the operation temperature or higher.

The warming up stage may further include a stage of determining whether a heating system of the vehicle has been operated or not. If the heating system has been operated, the warming up stage determines whether the temperature of cooling water is lower than the reference temperature or not, and if it is determined that the temperature of cooling water is lower than the reference temperature, the warming up stage drives the PTC heater.

According to the present disclosure, the PTC heater in a fuel cell vehicle is driven using electrical energy produced by the fuel cell stack so as to activate an electrical reaction between hydrogen and oxygen in the fuel cell stack, warming up the fuel cell stack.

Moreover, since the PTC heater is operated irrespective of vehicle occupants' control, providing warm air is immediately provided when the occupants activate the heating system.

BRIEF DESCRIPTION OF THE DRAWINGS

The above and other objects, features and advantages of the present disclosure will be more clearly understood from the following detailed description when taken in conjunction with the accompanying drawings.

DETAILED DESCRIPTION

Reference will now be made in greater detail to an exemplary embodiment of the disclosure, an example of which is illustrated in the accompanying drawings.

Figure 1:
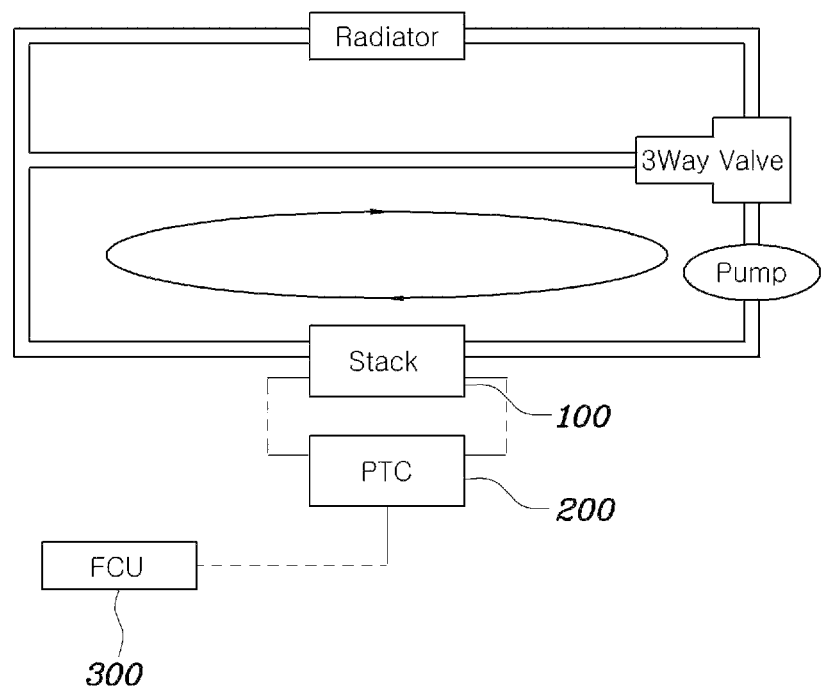
FIG. 1 is a view showing a construction of a system for operating a PTC heater in a fuel cell vehicle according to an embodiment of the present disclosure.
Figure 2:
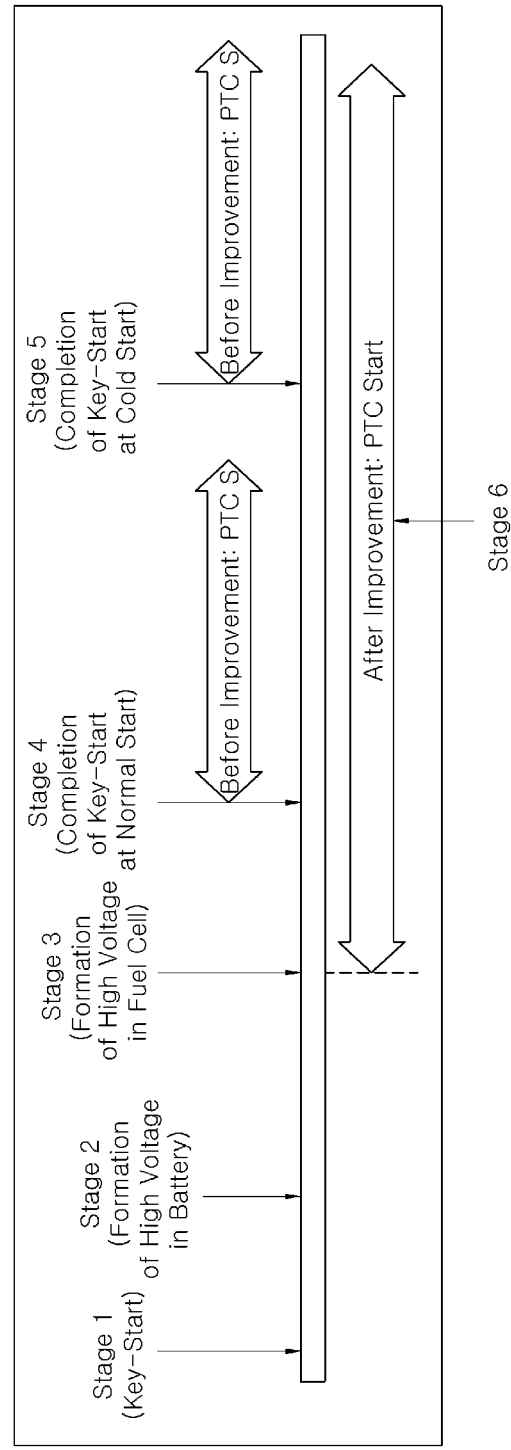
FIG. 2 is a view showing the operation of the system of FIG. 1.

FIG. 1 is a view showing a construction of a system for operating a PTC heater in a fuel cell vehicle according to an embodiment of the present disclosure, and FIG. 2 is a view showing the operation of the system of FIG. 1.

Prior to the description of the present disclosure, it is noted that the present disclosure controls a positive temperature coefficient (PTC) heater in a fuel cell vehicle so as to improve cold startability and heating efficiency. A radiator, a 3-way valve, and a water pump, which are shown in FIG. 1, are not designated with reference signs. A fuel cell stack, a fuel feeding system, an oxygen feeding system, a cooling water system, and an air conditioner, which constitute a fuel cell system of a fuel cell vehicle, are well-known elements, so a detailed description thereof will be omitted.

Further, the air conditioner for heating the interior of a fuel cell vehicle includes a heater device which heats air supplied inside of the vehicle by circulating through a heater core cooling water being heated with heat from the fuel cell stack. Another heater device operates using electrical energy from a battery or a fuel cell stack, which is mounted in a vehicle, thereby generating heat.

The latter heater device is a well-known positive temperature coefficient (PTC) heater which is used for a fuel cell vehicle and a diesel vehicle, so a detailed description thereof will be omitted.

According to the present disclosure, a system for operating a positive temperature coefficient (PTC) heater in a fuel cell vehicle includes a fuel cell stack 100; a PTC heater 200 generating heat when supplied with an electric current; and a controller 300 which is configured to check a key-start state of the vehicle, and determine whether or not an outdoor temperature is lower than a reference temperature. If it is determined that the vehicle is key-started so as to activate the fuel cell stack 100 and the outdoor temperature is lower than the reference temperature, the controller 300 supplies electrical energy generated by the fuel cell stack 100 to the PTC heater 200, thereby driving the PTC heater 200.

As described above, the fuel cell stack 100 and the PTC heater 200 will not be described in detail, and the controller 300 is a fuel control unit (FCU) that controls main parts of the fuel cell vehicle.

Referring to FIG. 2, a stage 1 (KEY START) is a stage where a driver is key-starting a fuel cell vehicle, and a stage 2 (FORMATION OF HIGH VOLTAGE) is a stage that after key-started, elements of the fuel cell stack 100, such as a blower and a water pump are being driven using a voltage from a battery in order to drive the fuel cell vehicle.

A stage 3 is a stage where oxygen and hydrogen are supplied to the fuel cell stack 100 so as to cause an electrochemical reaction, thereby forming a high voltage. A stage 4 is a stage that, after a sufficient amount of electricity to drive the fuel cell vehicle has been generated as the fuel cell stack 100 produces electrical energy, the vehicle is key-started so that the fuel cell vehicle enters a state of being able to be driven.

The above described stages start at room temperature. However, in winter when temperature falls to sub-zero temperature, cooling water and fuel in the fuel cell stack 100 are easily frozen, causing problems in the fuel cell system. In winter, it takes a long time, such as up to 170 seconds to complete the key-start state before reaching a desired temperature for smoothly driving a fuel cell system.

Furthermore, in a case of the conventional fuel cell vehicle, the PTC heater operates only after the completion of key-start. Even when the vehicle occupants drive a heating system, the PTC heater cannot be operated, therefore warm air is not supplied until the completion of the key-start.

To solve this problem, according to the present disclosure a method is provided including a stage 1 of key-start, a stage 2 of the formation of a high voltage from a battery to activate a fuel cell stack, a stage 3 of the formation of a high voltage in a fuel cell with the activation of the fuel cell stack, and a stage 6 of forcedly driving the PTC heater.

Specifically, the controller 300 is configured to check the key-start state of the vehicle and compare an outdoor temperature with a reference temperature. Here, the key-start state means that a driver manipulates a start key in order to drive the vehicle. That is, the key-start state is a state of starting the vehicle so that the fuel cell stack 100 can generate electrical energy.

The controller 300 compares the outdoor temperature with the reference temperature, wherein the reference temperature is set to minus 15 degrees Celsius, and thus, the controller checks whether the outdoor temperature is minus 15 degrees Celsius or lower.

In normal room temperature conditions, a fuel cell vehicle can be started with no issue because the fuel cell stack can reach the operation temperature in a short time. However, in sub-zero temperature conditions, a fuel cell vehicle has problems in starting because of the fuel and cooling water being frozen.

In order to determine whether the outdoor temperature falls to sub-zero temperature or not, the reference temperature is preset. Thus, if it is determined that the outdoor temperature falls to the reference temperature or lower, i.e. minus 15 degrees Celsius or lower, the controller 300 forcedly drives the PTC heater 200.

As such, if the vehicle is key-started to activate the fuel cell stack 100, and the outdoor temperature is lower than the reference temperature, the controller 300 controls the electrical energy generated by the fuel cell stack 100 to supply the PTC heater 200.

As such, forcedly driving the PTC heater activates a reaction between oxygen and hydrogen in the fuel cell stack 100 so as to generate electricity, thereby warming up the fuel cell stack which shortens a time period of the fuel cell stack 100 reaching an operation temperature. This considerably shortens key-start completion time in winter when the temperature is low.

Further, with the PTC heater 200 being driven after the formation of high voltage in the fuel cell at stage 3, key-start performance is improved, and warm air is instantly supplied as vehicle occupants intended to warm up the interior of the vehicle in winter time. A defroster may also be used to secure a driver's view. Thereby, the present disclosure can provides comfort and convenience.

The controller 300 can operate a blower of the fuel cell stack 100 at maximum output so as to activate and warm up the inside of the fuel cell stack 100.

According to the present disclosure, deficiency of electrical energy caused by driving PTC heater 200 using the electrical energy generated by the fuel cell stack 100 can be supplemented by increasing oxygen and hydrogen supply to the fuel cell stack 100.

The blower of the fuel cell stack 100 is operated at maximum output so as to increase fuel supplied to the fuel cell stack 100, and a chemical reaction between hydrogen and oxygen in the fuel cell stack 100 is activated.

The blower of the fuel cell stack 100 is operated at maximum output so as to warm up the fuel cell stack 100, and thus the temperature of the fuel cell stack 100 quickly elevates to the operation temperature. The key-start time of the fuel cell stack 100 can be shortened, thereby improving startability of the fuel cell vehicle.

Further, the controller 300 discontinues the electrical energy supply from the fuel cell stack 100 to the PTC heater 200 when the fuel cell stack 100 reaches the operation temperature.

According to the present disclosure, in order to improve startability of a fuel cell vehicle, the PTC heater is operated using electrical energy from the fuel cell stack 100 when the vehicle is key-started, activating and warming up the fuel cell stack 100.

When the fuel cell stack 100 reaches the operation temperature, the electrical energy supplied to the PTC heater 200 is discontinued, thereby preventing unnecessary power consumption and overheating of the fuel cell stack 100. Here, the operation temperature of the fuel cell stack 100 may range from 60° C. to 65° C.

That is, driving the PTC heater 200 consumes much electric power which is generated by the fuel cell stack 100, thereby activating the fuel cell stack 100. The activation accelerates warming up of the fuel cell stack so that the fuel cell stack 100 reaches the operation temperature. Then, the electrical energy supplied to the PTC heater 200 is discontinued so that the temperature of the fuel cell stack 100 cannot exceed the operation temperature, and unnecessary power generation can be prevented.

Further, the controller 300 may determine whether or not the temperature of cooling water is lower than the reference temperature when a heating system of the vehicle is operated.

If it is determined that the temperature of cooling water is lower than the reference temperature, the controller 300 drives the PTC heater 200.

According to the present disclosure, right after high voltage is formed in the fuel cell, the PTC heater 200 is forcedly supplied with electrical energy from the fuel cell to be driven. Fast heating of the PTC heater 200 provides warm air to the inside of the vehicle even before enough electrical energy has been generated to drive a motor of a fuel cell vehicle.

Although the PTC heater 200 may not be used for a long time due to high power consumption, the PTC heater can be used to quickly heat the interior of a vehicle particularly in winter when temperature is below zero. In this case, it is determined whether the temperature of cooling water is lower than the reference temperature or not. If it is determined that the temperature of cooling water is lower than the reference temperature, the PTC heater 200 maintains its driving state so as to provide warm air to the inside of the vehicle.

However, if, as the fuel cell stack 100 reaches the operation temperature, the temperate of the cooling water rises sufficiently so that warm air can be obtained only by the heat-exchange of the cooling water, the PTC heater 200 may be interrupted so as to prevent excessive power consumption, and the heating is performed using heat-exchange of the cooling water.

In addition, if the indoor or outdoor temperature is low, the PTC heater maintains its driving state. Also, if the indoor or outdoor temperature is at comfortable temperature level, the PTC heater 200 prevents excessive power consumption.

Figure 3:
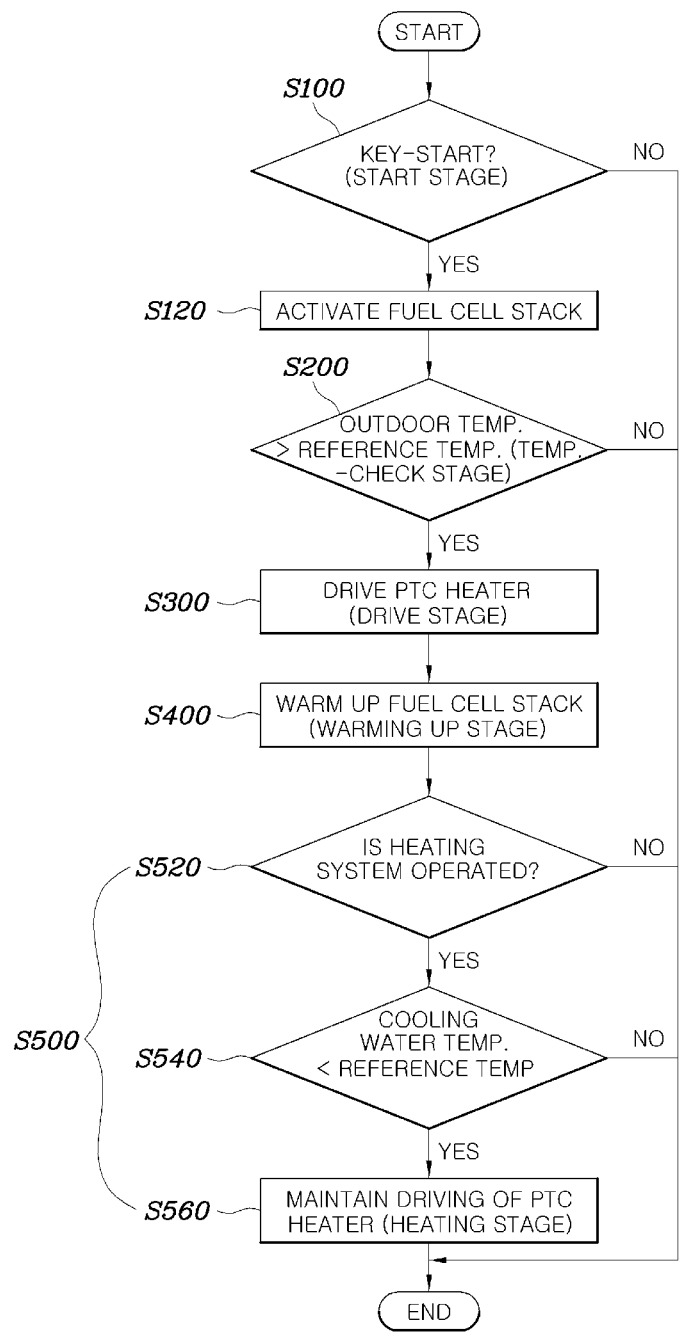
FIG. 3 is a flow chart showing a method of operating the PTC heater in a fuel cell vehicle according to an embodiment of the present disclosure.

FIG. 3 is a flow chart showing a method of operating the PTC heater in a fuel cell vehicle according to an embodiment of the present disclosure. The method includes a stage (S100) of checking a key-start state of the vehicle and if the vehicle is key-started, determining whether or not there is a voltage of the fuel cell stack, a stage (S200) of checking whether or not an outdoor temperature is lower than a reference temperature. A supplying stage (S300) supplies electrical energy generated by the fuel cell stack to the PTC heater so as to drive the PTC heater, if it is determined that the vehicle is key-started so as to activate the fuel cell stack (S120) and that the outdoor temperature is lower than the reference temperature, and an activating and warming up stage (S400) activates and warms up the fuel cell stack as the PTC heater is powered.

The warming up stage (S400) may discontinue the electrical energy supply from the fuel cell stack to the PTC heater when the temperature of the fuel cell stack reaches the operation temperature or more.

As such, forcedly driving the PTC heater activates a reaction between oxygen and hydrogen in the fuel cell stack so as to generate electricity, thereby warming up of the fuel cell stack, which shortens a time period of the fuel cell stack reaching the operation temperature and instantly providing warm air to the interior of the vehicle, thereby further improving an occupant's convenience.

The warming up stage (S400) may further include a stage (S500) comprising a stage (S520) of determining whether a heating system of the vehicle has been operated or not, a stage (S540) of, if the heating system has been operated, determining whether the temperature of cooling water is lower than the reference temperature or not, and a stage (S560) of driving the PTC heater to perform a heating process, if it is determined that the temperature of cooling water is lower than the reference temperature.

In the stage (S500), even if the fuel cell stack has reached the operation temperature, the operation of the PTC heater is not directly interrupted, but a determination is carried out at the stage (S520) whether the heating system was manually turned on or not. Here, if it is determined that the heating system was turned on, the stage (S540) is carried out to check whether the temperature of the cooling water is lower than the reference temperature. If the temperature of the cooling water is lower than the reference temperature, the stage (S560) maintains the driving stage of the PTC heater to continuously provide warm air to occupants. Here, the indoor or outdoor temperature may also be determined.

According to the present disclosure, the PTC heater in a fuel cell vehicle is driven using electrical energy produced by the fuel cell stack so as to activate an electrical reaction between hydrogen and oxygen in the fuel cell stack, thereby warming up the fuel cell stack.

Moreover, since the PTC heater is operated as the vehicle's occupants manipulate, thus warm air is immediately provided, and improving the performance with a help of a defroster.

Although an exemplary embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A system for operating a positive temperature coefficient (PTC) heater in a fuel cell vehicle comprising:
 a fuel cell stack;
 a PTC heater generating heat when supplied with an electric current; and
 a controller configured to check a key-start state of the vehicle, determine whether or not an outdoor temperature is lower than a reference temperature, and if it is determined that the vehicle is key-started to activate the fuel cell stack and that the outdoor temperature is lower than the reference temperature, supply electrical energy generated by the fuel cell stack to the PTC heater, thereby driving the PTC heater.

2. The system according to claim 1, wherein the reference temperature is minus 15 degrees Celsius, and the controller drives the PTC heater when the outdoor temperature falls to minus 15 degrees Celsius or lower.

3. The system according to claim 1, wherein the controller operates a blower of the fuel cell stack at maximum output so as to activate and warm up the fuel cell stack.

4. The system according to claim 1, wherein the controller discontinues the electrical energy supply from the fuel cell stack to the PTC heater when the temperature of the fuel cell stack reaches an operation temperature.

5. The system according to claim 1, wherein the controller determines whether or not the temperature of cooling water is lower than the reference temperature when a heating system of the vehicle is operated, and if it is determined that the temperature of cooling water is lower than the reference temperature, drives the PTC heater.

6. A method of operating a positive temperature coefficient (PTC) heater in a fuel cell vehicle comprising:
 a stage of checking a key-start state of the vehicle and if the vehicle is key-started, determining whether or not there is a voltage of a fuel cell stack;
 a stage of checking whether or not an outdoor temperature is lower than a reference temperature;
 a stage of supplying electrical energy generated by the fuel cell stack to the PTC heater, if it is determined that the vehicle is key-started so as to activate the fuel cell stack and that the outdoor temperature is lower than the reference temperature to drive the PTC heater; and
 a stage of activating and warming up the fuel cell stack as the PTC heater is powered.

7. The method according to claim 6, wherein the warming up stage comprises discontinuing the electrical energy supply from the fuel cell stack to the PTC heater when the temperature of the fuel cell stack reaches an operation temperature or higher.

8. The method according to claim 6, wherein the warming up stage further comprises: a stage of determining whether a heating system of the vehicle has been operated or not, a stage of determining whether the temperature of cooling water is lower than the reference temperature or not, if the heating system has been operated, and a stage of driving the PTC heater, if it is determined that the temperature of cooling water is lower than the reference temperature.

* * * * *